United States Patent [19]

Bishop

[11] 4,024,538
[45] May 17, 1977

[54] ELECTRONIC FILE AND RECORD KEEPER FOR SECONDARY RADAR TARGETS

[75] Inventor: Walton B. Bishop, Oxon Hill, Md.

[73] Assignee: The United States of America as represented by the Secretary of the Navy, Washington, D.C.

[22] Filed: Sept. 26, 1975

[21] Appl. No.: 617,269

[52] U.S. Cl. .......................................... 343/6.5 LC
[51] Int. Cl.² .......................................... G01S 9/56
[58] Field of Search ........ 343/5 VQ, 6.5 R, 6.8 LC, 343/6.5 LC

[56] References Cited

UNITED STATES PATENTS

| 3,801,980 | 4/1974 | Danton et al. | 343/6.5 LC |
| 3,922,673 | 11/1975 | Bishop | 343/6.5 |

Primary Examiner—Maynard R. Wilbur
Assistant Examiner—T. M. Blum
Attorney, Agent, or Firm—R. S. Sciascia; Philip Schneider; Norman Brown

[57] ABSTRACT

A warning is provided when a responding IFF target fails to satisfy friend-acceptance criteria in response to a given number of cryptographic interrogations. Target position information is utilized to aid in determining whether the responses under evaluation come from the same target.

2 Claims, 3 Drawing Figures

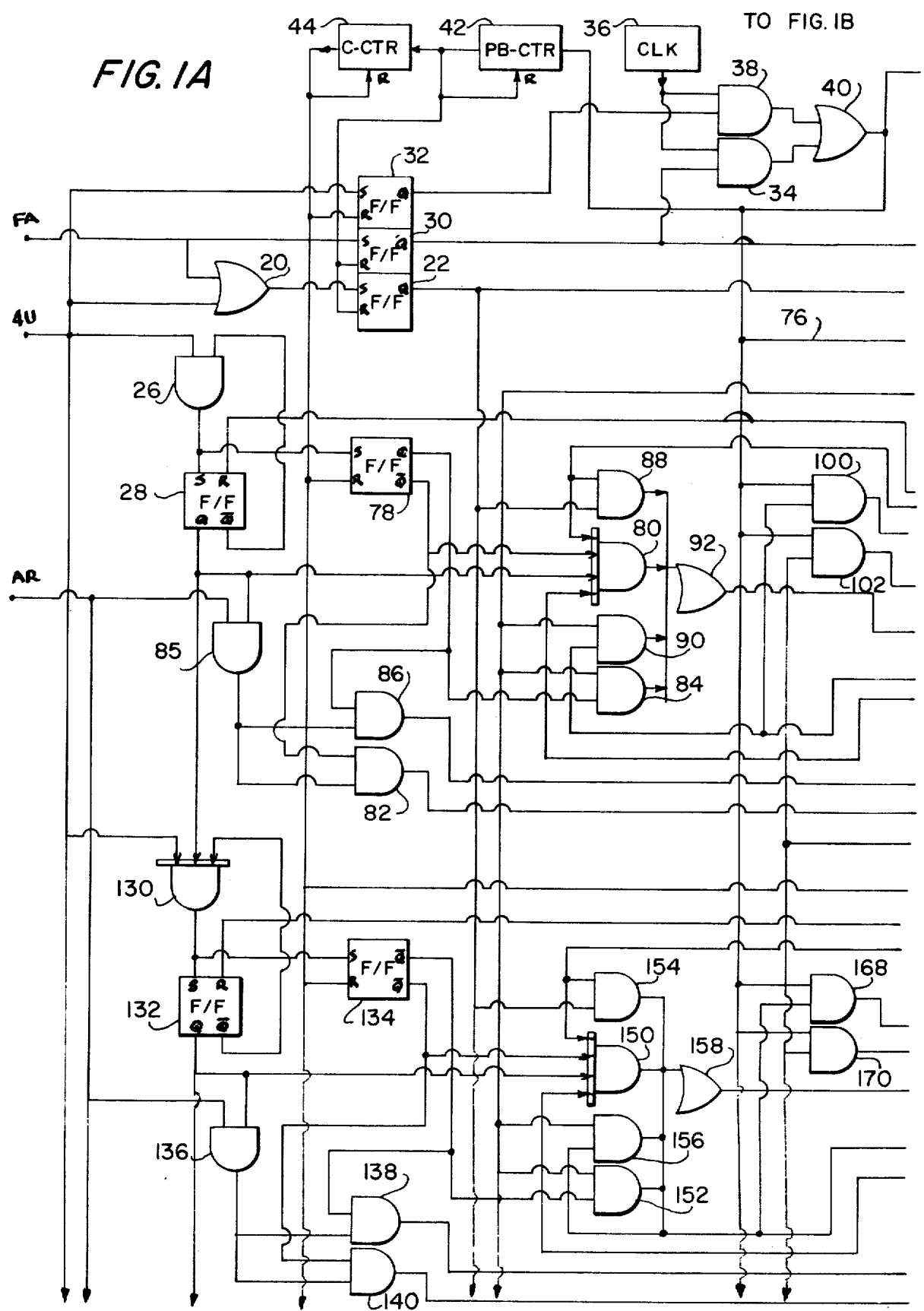
FIG. IA

ELECTRONIC FILE AND RECORD KEEPER FOR SECONDARY RADAR TARGETS

BACKGROUND OF THE INVENTION

In general, IFF equipment does not keep track of which Identification Friend or Foe (IFF) targets are given a chance to respond to cryptographic (e.g., Mode IV) IFF interrogations, nor how many chances each unknown target is given to reply correctly.

Existing IFF equipment generally provides an output signal FA if a target responds properly, and a different output signal 421 if it does not—but the operator must remember how many times he (or his equipment) has attempted to identify each target. The absence of any precise record of how many opportunities each target has been given to respond can easily result in giving a "spoofing" enemy far too many chances to guess acceptable replies. The direct result is that the "enemy acceptance criterion" generally specified for the equipment may not be satisfied.

Further, it is desirable to automatically limit the number of cryptographic interrogations that unknown target is given in accordance with some predetermined limit. There is, in general, no IFF equipment today that retains information concerning targets obtained on one scan for use on another scan. Generally, information obtained on a scan is used to make a decision, and the information is then erased.

SUMMARY OF THE INVENTION

The present invention records the location of each of a number of IFF targets that fail to response properly to a valid set of IFF cryptographic interrogations. If the same target fails to respond properly to a second set of interrogations, its new position is recorded and stored. If, after a specified number of opportunities, the target still has not responded properly a warning signal is provided to indicate that the particular target cannot be accepted as a friend.

It is therefore an object of the present invention to decide when an IFF target has failed to correctly respond to a given number of cryptographic interrogations;

It is another object of the present invention to limit the number of cryptographic interrogations made to an unknown target;

It is a further object of the present invention to utilize target position information in cooperation with reply response information to determine whether an unknown IFF targe is a friend or enemy;

Other objects, advantages and novel features of the invention will become apparent from the following detailed description of the invention when considered in conjunction with the accompanying drawings wherein:

DESCRIPTION OF THE DRAWINGS

FIG. 1a and 1b together form a functional schematic diagram of the preferred embodiment of the invention.

DETAILED DESCRIPTION OF THE INVENTION

Figure 1B:
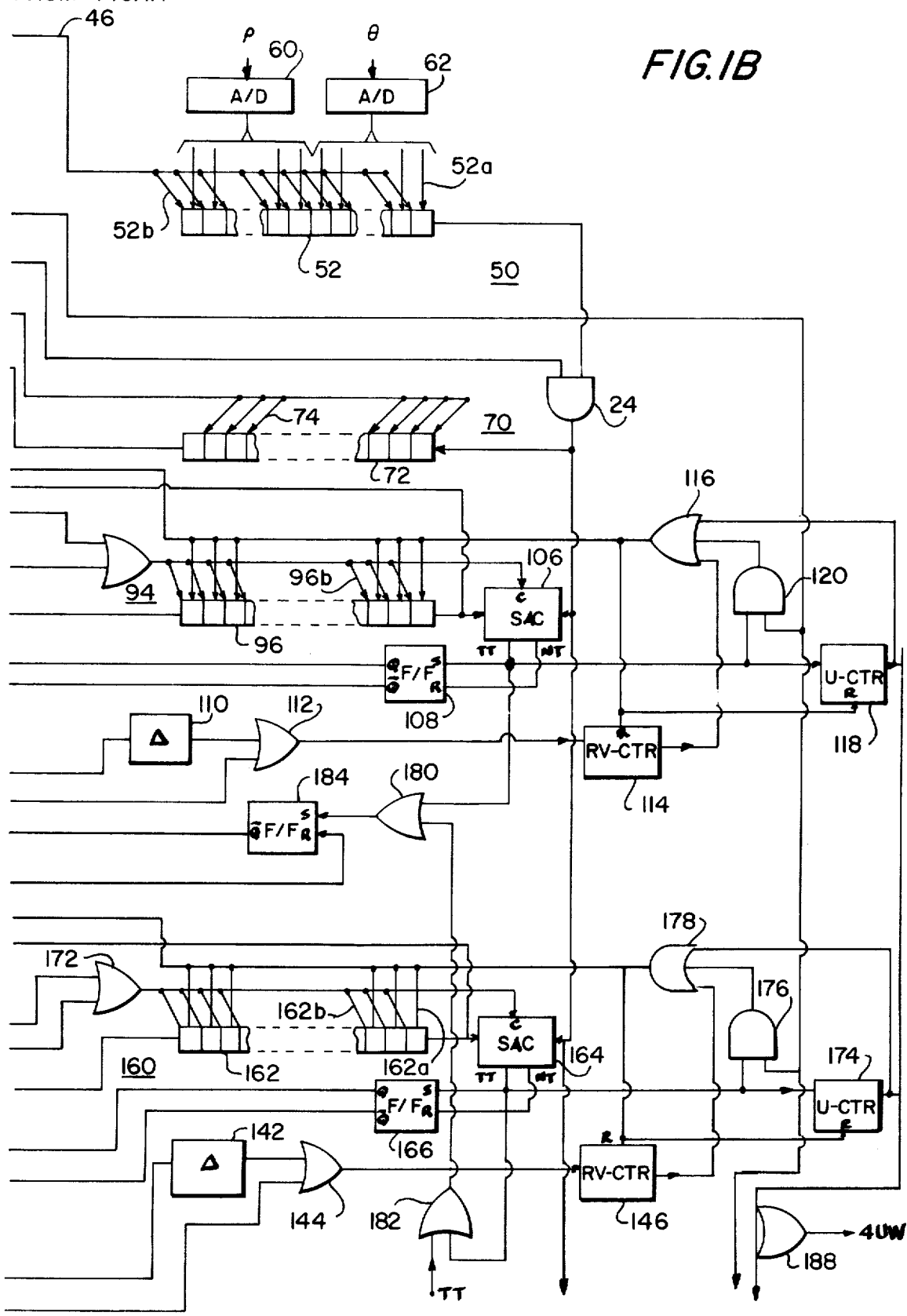
Figure 2:
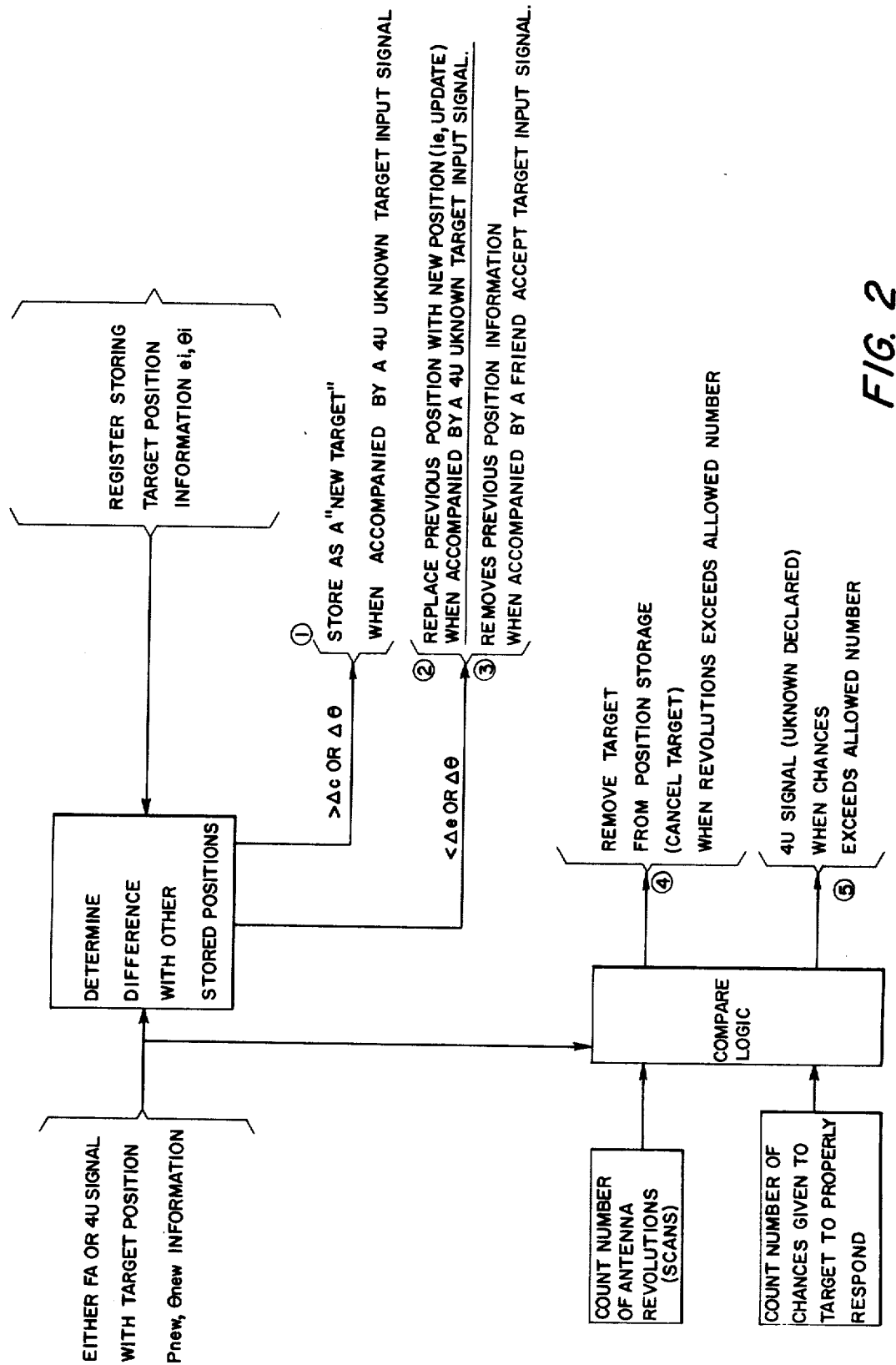
FIG. 2 is a functional block diagram of the decisional strategy that the preferred embodiment implements.

Referring now to the FIG. 1a and 1b, the embodiment of the present invention has four signal input terminals, FA, 4U, AR, and TT. It has two data input terminals denoted as $\rho$ and $\zeta$. The embodiment also has an output terminal 4 UW.

Although the input signals are described hereinafter, a brief description of their characters will be given at this point. Note that the signals FA, 4U, AR, and TT are provided by existing IFF equipment with which the present invention operates associatively, and the $\rho$ and $\theta$ signals are provided by the radar equipment with which the IFF operates associatively.

FA — each time a cryptographic IFF system determines that the replies from a particular target satisfy a prescribed "Friend Accept" criterion, a pulse, designated here as FA, is produced.

4U — each time a cryptographic IFF system determines that a detected target fails to provide replies that satisfy the prescribed Friend Accept criterion during a given look at (i.e., scan of the antenna past) a particular target, a pulse (4U) is produced. This pulse indicates that the cryptographic Mode 4 circuits have been unable to identify the target as a friend.

AR — each time the antenna of the associated equipment passes an angular reference point, a pulse (AR) is produced.

TT — this is an output signal produced by a subtract-and compare circuit (such as SAC 106 in FIG. 1B) whenever it determines that a target which resulted in production either of an FA or 4U signal is a target that appeared on a previous scan and hence should be called a Tracked Target. The input TT is produced by a SAC unit in the associated IFF equipment.

$\rho$ and $\theta$ — these are signals which provide the range and azimuth, respectively, of a given target relative to the associated radar equipment. These signals are provided here in binary form.

An OR device 20 has a first input terminal coupled to friend-accept input terminal FA. The output terminal of OR 20 is coupled to the set terminal S of a flip-flop device 22, whose noncomplementary output terminal Q is in turn coupled to an input of an AND device 24. The other input terminal of OR 20 is coupled to input terminal 4U, as is a first input terminal of an AND device 26. The output terminal of AND 26 is connected to the set input terminal S of a flip-flop device 28, while the other input terminal of AND 26 is coupled to the complementary output terminal $\overline{Q}$ of flip-flop 28.

Input terminal FA is also coupled to a set terminal S of a flip-flop device 30. Another flip-flop 32 has its set input terminal S coupled to input terminal 4U. The noncomplementary output terminal Q of flip-flop 30 is coupled to an input terminal of an AND device 34. The output of a digital clock 36 is coupled to the other input terminal of AND 34. The noncomplementary output terminal Q of flip-flop device 32 is coupled to the first input terminal of an AND device 38, whose second input terminal is coupled to the output of digital clock 36.

An OR device 40 has one input terminal coupled to the output of AND gate 34 and other input terminal coupled to the output of AND 38. The output of AND 40 is coupled to the input terminal of a PB counter 42. The output of counter 42 is coupled to the input of a C-counter 44, and to the reset terminal R of flip-flop devices 22 and 30, as well as to its own reset terminal R. The output of AND 40 is also coupled to a shift-bus 46 of a shift register 50.

Shift register 50 is comprised of 18 stages 52, each stage having an input tap 52a and a shift tap 52b. The shift tap 52b of each stage is connected to shift-bus 46. The first nine stages of shift register 50 have their input taps 52a connected to the output terminals of a data analog-to-digital converter 60, which has an input terminal for receiving an analog signal p from the associated IFF system. The second nine stages of shift register 50 have their input taps 52a connected to the output of a date-analog-to-analog converter 62, which has an input terminal for receiving an analog signal 0 from the associated IFF system. The output of shift register 50 is taken from its 18th stage The shift register output is connected to a second input terminal of AND 24. The output of AND 24 is connected to the input of another shift register 70, also having 18 stages 72. Each stage 72 has a shift tap 74 connected to a shift-bus 76.

The output of AND 26 is connected to the set terminal S of a flip-flop 78. The complementary output terminal Q of flip-flop 78 is connected to an input terminal of an AND device 80, and to a first input of an AND gate 82. The noncomplementary output terminal Q of flip-flop 78 is connected to the first input terminal of an AND gate 84, and to the first input terminal of the AND device 86.

Flip-flop 28 has its noncomplementary output terminal Q connected to a first input terminal of an AND device 85 and to a second input terminal of AND device 80. The other input terminal AND device 85 is connected to input terminal AR. The output of AND 85 is connected to a second input terminal of AND devices 82 and 86.

The noncomplementary output terminal Q of flip-flop 22 is connected to a first input terminal of an AND device 88.

The output terminal of shift register 70 is connected to a first input terminal of an AND device 90 and to a second input terminal of AND 84. The output of each of AND devices 80, 84, 88, and 90 is connected to an input terminal of an OR device 92. The output of OR 92 is connected to the input terminal of a shift register 94. Shift register 94 is comprised of 18 stages 96, each stage having an input tap 96a and a shift tap 96b.

The output terminal of OR 40 is connected to shift-bus 76, and to the first input terminal of two AND devices 100 and 102. The output of each AND device 100 and 102 is connected to an input terminal or an OR device 104, whose output terminal is in turn coupled to each shift tap 96b of shift register 94.

The output of shift register 94 is taken from the 18th register stage and is connected to both another input terminal of subtract-and-compare (SAC) device 106.

The output of OR 104 is also coupled to a clock terminal C of a subtract-and-compare (SAC) device 106. The DAC device 106 has a first input terminal connected to the output of shift register 94, and a second input terminal connected to the output of AND 24. The SAC device 106 has two output terminals, the first denoted as TT (for "Tracked Target") and the second denoted as NT (for "New Target"). The TT output terminal is connected to the set terminal S of a flip-flop device 108, while the other output terminal NT is connected to the reset terminal R of flip-flop 108. The non-complementary output terminal Q of flip-flop 108 is connected to a second input terminal of AND 100, and to a second input terminal of AND 90. The complementary output terminal Q of flip-flop 108 is connected to a third input terminal of AND device 80.

The output of AND 86 is connected through a delay device 110 to a first input terminal of an OR device 112. The output of OR 112 is connected to the input of an antenna revolution RV-counter 114. The output of AND 82 is connected to the other input of OR 112. The output of RV-counter 114 is connected to a first input of an OR device 116. The output of OR 116 is connected to each input tap 96a of every stage 96 of shift register 94, and also to the reset terminal R of flip-flop 28 and RV-counter 114.

The TT output terminal of SAC 106 is also connected to the input terminal of a "unknown target" U-counter 118, whose output is in turn connected to a second input terminal of OR 116. A reset terminal R of U-counter 118 is connected to the output terminal of OR 116. Output terminal TT is also connected to a first input terminal of an AND device 120, whose output terminal is coupled to a third input terminal or OR 116.

The device input terminal 4U is connected to a first input terminal of an AND device 130. A second input terminal of AND 130 is coupled to the noncomplementary output terminal Q of flip-flop 28. The output of AND 130 is coupled to the set terminal S of each of two flip-flop devices 132 and 134. The complementary output terminal Q of flip-flop 132 is connected to a third input terminal of AND 130. The noncomplementary output terminal Q of flip-flop 132 is connected to an input of an AND gate 136. The device input terminal AR is connected to a second input terminal of AND 136.

The output of AND 136 is coupled to an input terminal of each of two AND devices 138 and 140. The output of AND 138 is coupled through a delay device 142 to the input of an OR device 144, while the output of AND 140 is coupled to a second input terminal of OR 144. The output of OR 144 is coupled to the input of a second RV-counter 186.

Flip-flop 134 has its complementary output terminal Q coupled to a second input terminal of AND 140, and to an input terminal of an AND device 150. The noncomplementary output terminal Q of flip-flop 132 is connected to a second input terminal of AND 150. The noncomplementary output terminal Q of flip-flop 134 is connected to a second input of AND 138, and to an input terminal or an AND device 152.

The noncomplementary output terminal Q of flip-flop 22 is also coupled to a first input terminal of an AND device 154. The output of shift register 70 is also coupled to an input of AND 152 and an input of an AND device 156. The outputs of AND devices 150, 152, 154, and 156 are connected to the input terminals of an OR device 158.

The output terminal of OR 158 is connected to the input terminal of a shift register 160. Shift register 160 is comprised of 18 shift register stages 162, each stage having an input tap 162a and a shift tap 162b. The output of shift register 60 is taken from its last stage, which is connected to the input terminal of a subcontractor and comparator device (SAC) 164. The output of AND 24 is connected to both a second input terminal of SAC 164, and to a second input terminal of SAC 106. Subcontractor and comparator device 164 also has two output terminals, denoted as TT and NT. The TT output terminal of SAC 164 is connected to a set terminal S of a flip-flop 166, while its output terminal NT is connected to the reset terminal R of flip-flop 166.

The complementary output terminal Q of flip-flop 166 is compled to a second input terminal of AND device 150. The noncomplementary output terminal Q of flip-flop 166 is connected to a second input terminal of AND 156, and to an input terminal of an AND device 168. The output terminal of OR 40 is connected to a second input terminal of AND 168 and to an input terminal of an AND device 170. The output from AND devices 168 and 170 are connected to the input terminals of an OR device 172, whose output terminal is coupled to shift tap 162b of each stage of shift register 160, and to the clock input terminal of SAC 164.

The TT output terminal of SAC 164 is also connected to the input terminal of a U-counter 174, and to the input terminal of an AND device 176. A second input terminal of AND 176, and a second input terminal of AND 120 are connected to the noncomplementary output terminal Q of flip-flop 30.

The output of AND 176 is coupled to an input terminal of an OR device 178, whose output is connected to the input tap 162a of each stage of shift register 160. The output of OR 178 is also coupled to the reset terminal R of flip-flop 132, RV-counter 186, and U-counter 174.

The output of RV-counter 186 is connected to a second input terminal of OR 178. The output terminal of U-counter 174 is connected to a third input terminal of OR 178. The output of shift register 160 is also coupled to a second input terminal of each of AND devices 150 and 154.

The TT output terminal of SAC 106 is also connected to an input terminal of an OR device 180. The output of an OR device 182 is connected to the other input terminal or OR 180. The TT output terminal of SAC 164 is connected to a first input terminal of OR 182. A second input terminal of OR 182 is connected to the device input terminal TTT. The output terminal of OR 180 is connected to the set terminal S of a flip-flop 184, whose complementary output terminal Q is connected to a second input terminal of both AND devices 102 and 170.

The output of C-counter 44 is connected to the reset terminal R of itself, and to flip-flops 32, 78, 134, and 184.

An OR device 188 has its input terminals coupled to the output terminal of U-counters 118 and 174. The output of OR 188 forms the device output terminal 4UW.

DESCRIPTION OF OPERATION

The embodiment of the present invention is adapted to be utilized in conjunction with an IFF system providing information concerning the angular position $\theta$ (azimuth angle) of the antenna when receiving target replies, and associated target range information $\rho$. In addition, the embodiment of the invention is adapted to receive from the associated IFF system various other input signals which indicate: passing by the antenna of an angular reference position (AR signal); the making by the IFF system of a friend-accept decision regarding the target being evaluated (FA signal); and the failure by the target to correctly respond to a cryptographic interrogation (4U signal).

Terminal $\rho$ of an A/D converter 60 is adapted to receive analog range information corresponding to the range bin (range information) which caused a target leading edge indication. The analog range information is converted into digital form by the Range-Analog-to-Digital converter 60 and stored in shift register 50 (in the first 9 bits positions, obviously, any desired number of bits may by used by correspond to the range resolution desired). Terminal $\theta$ of A/D converter 62 is adapted to receive analog azimuth information (indicating interrogator-antenna bearing). This information is converted into digital form by A/D converter 62 and transferred to the second half of shift register 50. Thus register 50 contains in binary form the range and azimuth of each responding target when either a Friend-Accept decision is made by an associated IFF subsystem, or when a decision is made that the target is determined to be a cryptographic-interrogation reply (i.e., mode 4) unknown for a given scan of the interrogator's antenna.

The unknown decider of the described embodiment is adapted to receive, at its input terminal AR, a signal consisting of a pulse that occurs each time the antenna passes a preselected angular reference point. These pulse signals are used to count the number of antenna revolutions, and therefore the number of "scans" or "looks." Clock 36, utilized to syncronize the device circuit, is free-running and hence may be replaced by most any source of timing pulses.

The described embodiment is also adapted to receive at input terminal 4U, an incorrect reply pulse each time a detected target fails to satisfy the IFF system's Friend-Accept criteria provided of course that the associated IFF equipment determines that there is no other reason for suspecting that the target is not a friend.

When the first incorrect reply alerting signal (4U signal) occurs, it will set flip-flop 32, pass through AND 26 to set slip-flops 28 and 78, and pass through OR 20 to set flip-flop 22. (It will be unable to pass AND 130). Setting of flip-flop 32 provides a noncomplementary output signal to AND 38, thus permitting clock pulses from clock 36 to pass through AND 38 and OR 40. These clock pulses cause the contents of shift register 50 to shift to the right, cause the contents of shift register 70 to shift to the left, and cause shift registers 94 and 160 to shift to the right (when permitted to pass appropriate AND gates). These clock pulses also are applied to the position but counter PB-CTR-42 which produces an output pulse when a count of 18 (the number of stages in each of the shift registers) is reached.

The first output pulse from PB-CTR-42 resets flip-flop 22 (flip-flop 30 is already in the reset position); resets PB-CTR-42 to zero, and causes the cycle counter C-CTR-44 to count up one unit. The second pulse from PB-CTR 42 causes the C-CTR 44 to produce an output pulse that resets flip-flops 32 and 78, and also resets C-CTR 44 to zero. Thus, the first incorrect reply alerting signal pulse entering on the 4U input terminal will cause 36 clock pulses to pass AND 38. Flip-flop 78 will remain set while these pulses pass, but flip-flop 22 will be reset after the first 18 of them have passed.

The first 18 clock pulses from AND 38 will cause shifting of the contents of shift register 50 through AND 24 (which is enabled, or held upon, by flip-flop 22) into shift register 70, and bit-by-bit into subtractor/comparator (SAC) 106. (The clock pulses also go to SAC 106 (for control purposes), and pass through AND 102 and OR 104 to shift register 94. As these bits are shifted into SAC 106, corresponding bits from shift register 94 are shifted into SAC 106, through AND 88 (which is enabled by flip-flop 22) and OR 92, back into shift register 94. In this case (following the first 4U input signal pulse) the contents of shift register 94 will be all zeros.

Subtractor/comparator 106 determines the difference between azimuth $\theta$ of the target that caused the nput signal at terminal 4U, and the azimuth of an earlier detected target (if any) which, may be stored in hift register 94. Then it determines the difference between the range ρ of the target that caused the 4ρ nput signal and that of an earlier detected target. If the difference between the azimuth bits in shift register 50 nd those in shift register 94 are less then or equal to Δθ nd the difference between the range bits in shift register 50 and those in shift register 94 are less then or qual to Δρ, then subtractor/comparator 106 produces n output signal on its output terminal TT indicating a "tracked target." If the difference between the two zimuths is greater than Δθ, or if the difference between the two ranges is greater than the Δρ, then subtractor/comparator device 106 produces an output ignal on its terminal NT, indicating a "new target." The numbers Δθ and Δρ are chosen so that the succesive azimuths of a target will not differ by more then Δθ nd the successive ranges will not differ by more then ρ on any two successive scans of the interrogators ntenna where Δθ and Δρ are based on the expected arget speed.

Note that an NT output signal from subtract or comarator 106 simply resets flip-flop 108 (if it is not aleady in the reset position) but a TT-output signal not nly sets flip-flop 108 but also goes through OR 180 to et flip-flop 184. Setting of flip-flop 108 opens AND 90 nd closes AND 80 (for reasons to be explained later), nd also opens AND 100 so that clock pulses can pass hrough AND 100 and OR 104 to shift register 94 when AND 102 is closed. Note also that AND 102 will be losed by the setting flip-flop 184. This unusual arangement is needed to prevent what is a tracked target or one register from being entered as a new target in nother.

It should be noted here that subtractor-comparator evices of the type utilized in this described embodient are well known in the digital electronic art. They re typically described, beginning at page 213, in Computer Logic" by Flores published by Prentice-Iall, 1964.

If subtractor-comparator 106 produces an output NT ignal then the 19th through 36th clock pulses from lock 36 will shift the contents of shift register 70 hrough AND 84 (which is held open, or enabled, by ip-flop 78) and through OR 92 into shift register 94. Thus, shift register 94 will now hold the position bits of he target with respect to which a "mode 4 unknown" ecision was made. Note that the resetting of flip-flop 2 at the 18th clock pulse removes one input from AND 24 and AND 88.

Coincident with the 36th pulse (which completes the oading of the unknown target's position bits into shift egister 94), the pulse from C-counter 44 resets flipops 32 and 78, thus preventing further clock pulses om passing AND 38 and removing an input signal om AND 84.

Turning now to consideration of additional functions erformed by flip-flops 28 and 78 (which were set by the first 4U signal pulse): Setting of flip-flop 28 reoves the complementary output signal at terminal Q o that no further 4U input pulses can pass AND 26, nd the setting also produces a noncomplementary utput signal at terminal Q, thereby providing an input o AND 130, 86, and 80.

The input to AND 130, along with one from the ormally reset flip-flop 132 opens AND 130 to the next U pulse that enters (the described embodiment shown in FIG. 1 is designed to process 4U pulses separated by at least the time required for 36 counts by clock 36). The input to AND 80, as will be described later, helps maintain the proper position bits in shift register 94.

The noncomplementary output signal at terminal Q is applied to AND 86 and opens it so that antenna revolutions signal pulses arriving at input terminal AR will be able to pass. A pulse will enter via the AR input terminal once for each revolution of the interrogation antenna. If one of these signal pulses happens to enter while clock pulses are still causing the shift registers to shift, the outputs from flip-flop 78 will cause the signal pulse to pass through AND 85, and will not allow it to pass AND 82. Pulses from AND 86 will at all other times be allowed to pass through AND 82 but not through AND 86 (because flip-flop 78 will then be providing only a complementary output signal at its Q terminal). When a pulse passes through AND 86 it will be delayed long enough by delay device 110 to allow the shift register 94 to have stopped shifting before it goes through OR 112 to the antenna revolution counter RV-CTR 114. Pulses passing through AND 82 go directly through OR 112 to RV-CTR 114 which then counts up one unit.

For convenience, the following discussion will assume that RV-CTR 114 will produce an output signal each time it reaches a count of five.

Considering now what happens when a second 4U pulse from the same target is received at terminal 4U. In this case, subtractor/comparator 106 will find that azimuth bits stored in the shift register 94 (or a corresponding shift register such as register 160) will differ by Δθ or less from those in shift register 50, and the range bits will differ by Δρ or less. Hence, subtractor comparator 106 will produce a tracked target output pulse TT that will set flip-flop 108, cause U-counter 118 to count up one unit, and will pass through OR 180 to set flip-flop 184. The setting of flip-flop 108 opens AND 100, removes an input signal from AND 80, and applies an input signal to AND 90 so that the second 18 clock pulses will cause the updated position bits of the cryptographic mode (i.e., mode 4) unknown target to be shifted from shift register 70 through AND 90 and OR 92 into shift register 94. The setting of flip-flop 184 closes AND 170 so that the second 18 clock pulses cannot reach shift register 160 and hence, the position of this "tracked target of shift register 94" cannot be entered into shift register 160 as a new target. The output pulse from C-counter 44, which occurs coincidentally with the thirty-sixth clock pulse resets flip-flop 184.

Assume now that a 4U pulse from a different unknown target enters before an input signal occurs on input terminal FA, and before RV-CTR 114 reaches a count of five. When this second 4U pulse enters it will pass through AND 130 instead of AND 26. It will thus set flip-flops 132 and 134 (instead of flip-flops 28 and 78) which perform the same functions with respect to shift register 160 that flip-flop 28 and 78 perform with respect to shift register 94. This second 4U pulse will also set flip-flops 32 and 22 just as the first pulse did; so again 36 clock pulses will pass through AND 38. Flipflop 22 will be reset when the 18th clock occurs; and flip-flops 32 and 134 will be reset at the occurrence of the 36th clock pulse.

If the second 4U pulse was produced by a different target than that which produces the first 4U pulse, then subtractor-comparator device 106 will find that the azimuth bits in shift register 50 differ from those in shift register 94 by more than $\Delta\theta$, or will find that the range bits differ by more then $\Delta\rho$, or both. In this case subtractor-comparator 106 will produce an output signal on its output terminal NT. This output signal performs no function since flip-flop 108 will already be in the reset position. The position bits that were stored in shift register 94 will be shifted back into shift register 94 as they are compared with bits from shift register 50 (as earlier described), and will be cycled back into shift register 94 a second time (through AND 80 and OR 92) by clock pulses 19 through 36. While subtractor-comparator 106 is making the comparison just described (and stored bits are being returned to shift register 94), subtractor-comparator 164 will be performing functions similar to those described for subtractor-comparator 106 following receipt of first 4U pulse. This will result in the storage of the position bits of this second target in shift register 160.

Returning to operation of the unknown decider operating in response to 4U pulses only, which each indicate that a detected target has failed to satisfy the cryptographic mode Friend-Accept criterion. The first time a detected target fails to satisfy the cryptographic mode Friend-Accept criteria and there is no severe reply-frequency jamming present its corresponding digital position bits are stored in a shift register (the two registers 94, 160 as shown (only these two registers are shown but there may be any desired number of such registers corresponding to the number of targets desired to have simultaneously stored). The second time a detected target fails to satisfy the Friend-Accept criteria, its new (i.e., up-dated) position bits are stored in place of the original ones, and the corresponding "unknown" input counter (e.g., U-counter 118) counts up one unit. Note that each time a subtractor-comparator device produces a tracked target (TT) output pulse, that pulse prevents all of the registers that may contain stored position bits, except the one that contains the position bits of the tracked target, and shift register 70, from being shifted by the second eighteen clock pulses. Note also that the TT pulses from other subtract/comparator units reach flip-flop 184 via OR 182 and OR 180. When the U-counter reaches a count of U (U should be taken equal to three if the present practice of allowing each target four chances to satisfy mode 4 criterion is to be followed. A cryptographic interrogation unknown warning signal (4UW) is produced. Note that the output of U-counter 118 goes through OR 188 to produce this output signal. The pulse from U-counter 118 also goes through OR 116 to clear shift register 17, reset RV-CTR 114 and U-CTR 118, and reset flip-flop 28 (so that the position bits of a new (unknown) target can be stored in shift register 94).

If the antenna revolution counter RV-CTR 114 reaches its maximum count (of five in this case) before a target has been given its (four) chances to satisfy the mode 4 acceptance criterion, then the target position bits are removed from storage so that the process may be started over.

If the unknown target whose address is stored in shift register 94 is not identified as a Friend, and no firm decision to declare a special interrogation unknown warning concerning the target (i.e., after some fixed predetermined number of antenna revolutions have taken place), an output pulse from RV-CTR-114 goes through OR 116 to clear shift register 94 and reset flip-flop 28. This pulse also resets RV-counter 114 and U-counter 118 back to zero. This procedure is needed in the event that an operator is too preoccupied (with other targets, for example) to give a particular target four consecutive chances to satisfy the mode 4 criterion. (The RV-CTR 114 would not be needed in a fully automatic all-target reply evaluator.)

Each time a target is accepted as a friend by the cryptographic mode Friend-Accept decider and the reply interference-jamming detector determines that this decision could not be due to an enemy guessing at replies, a pulse enters the unknown decider on input terminal FA. This pulse sets flip-flop 30 and passes through OR 20 to set flip-flop 22. The setting of flip-flop 30 opens AND 34 to clock pulses from clock 36 (so that the shift registers will shift as they did when AND 38 was open). But since flip-flop 30 is reset, when the 18th pulse occurs, only 18 shifts will occur. During these 18 shifts, the position bits of the target that produced the Friend-Accept pulse will be compared with the stored position bits of all cryptographic mode (i.e., mode 4) targets stored in shift registers 94, 160 (or similar registers).

If the subtractor-comparators determine that the friendly target is not in a position where one of the cryptographic modes for interrogation unknowns is located, all storage registers are left with their contents as they were (e.g., the contents of shift register 94 will be shifted through AND 88 and OR 92 back into shift register 94). However, if, for example, subtractor-comparator 106 finds that the position bits of the target that produced the Friend-Accept input signal differ by less than $\Delta\theta$ and $\Delta\rho$ from the position bits stored in shift register 94, it will produce a TT output signal that will now be able to pass AND 120 (since AND 120 will be enabled by the noncomplementary output signal from flip-flop 30). The pulse through AND 120 will clear shift register 94 and (as described previously) prepare its associated circuitry for the storage of a new unknown target's bits. This TT output signal will also set flip-flop 184 and thus prevent the position bits of the target that produced the Friend-Accept input from being stored in any register that might be empty.

It should be noted that the arrows pointing down at the bottom of FIG. 1 indicate connections to circuits identical to those shown associated with shift register 160. Enough such circuits should be provided to allow one for each mode 4 unknown target expected to be under simultaneous surveillance. Although at present, a single operator would seldom be expected to handle more then three or four unknowns simultaneously, use of the unknown decider of the present invention will simplify "bookkeeping" problems such that he might easily handle 10 or 15 targets simultaneously and without error. Also, if several operators are working at the same location, a single unknown decider of the present invention could provide 4UW output signals to all of them. In such installations perhaps 20 or 30 shift registers like shift register 94 and 160 might be needed. In a fully automatic system, there would still seldom be a need for more then 30 or so storage registers, as few operational units would ever be expected to keep track of more than this number of unknowns.

The importance of the unknown decider deserves special emphasis. The cryptographic (i.e., mode 4) of IFF mark XII cannot guarantee that an fixed enemy acceptance (EA) criterion will be satisfied unless a fixed upper limit is placed upon the number of attempts of spoof that an enemy will be allowed. In military installations, the number of chances to be given an enemy (or a friend) is usually left up to the operator. In many installations, Army, Navy, and Air Force, no attempt is made to limit the number of attempts to identify a target. In such installations, of course, the enemy acceptance criteria usually specified for the IFF system are seldom met. Use of the unknown decider of the present invention as described here would permit the specified enemy acceptance criteria to be satisfied easily both at large and small installations.

To recapitulate the operation of the described embodiment:

First, each mode-4 (cryptographic) unknown's position is stored
 a. In a previously empty register if it differs by $\Delta\rho_o$ or $\Delta\theta_o$ or more from a position of another target's previously stored position.
 b. In place of its previously stored position if it differs by less than $\Delta\rho_o$ or $\Delta\theta_o$ from its previously stored value.

Second, the U-counter counts the number of times that its target is given a chance to reply. (The target has a chance to identify himself only if the antenna scans past him and the range gate is adjusted to receive signals from his range).

Third, the antenna revolution counter counts the number of scans of the antenna past an unknown target whose position bits are stored. If the range gate has not been on a target for a predetermined number of revolutions (e.g., 4 or 5), then the target's position will usually differ from the stored $\rho_i$, $\theta_i$ by more than $\Delta\rho$, $\Delta\theta$, it is automatically erased.

Fourth, a friend-accept input signal respecting a target will cause the target's stored position bits to be removed, since they will differ from the $\rho_{new}$, $\theta_{new}$, by less than $\Delta\rho_o$, $\Delta\theta_o$.

Obviously many modifications and variations of the present invention are possible in light of the above teachings. It is therefore to be understood that within the scope of the appended claims the invention may be practiced otherwise than as specifically described.

What is claimed and desired to be secured by letters patent of the United States is:

1. A method for maintaining IFF target position information and for providing target status information regarding new target position information $\rho_{new}$, $\theta_{new}$ and previously stored position information $\rho_i$, $\theta_i$ received in a scanning antenna system, and for providing a target status indication comprising the steps:
 comparing $\rho_{new}$, $\theta_{new}$ with each $\rho_i$, $\theta_i$ previously stored, forming a difference quantity $\Delta\rho = \rho_{new} - \rho_i$ ;
 forming a difference quantity $\Delta\theta = \theta_{new} - \theta_i$ ;
 storing $\rho_{new}$, $\theta_{new}$ as a new target if the difference quantity $\Delta\rho$ or the difference quantity $\Delta\theta$, is greater than corresponding predetermined quantities $\Delta\rho_o$, $\Delta\theta_o$ and the new information is accompanied by a 4U unknown target input signal;
 replacing corresponding position information with updated position information $\rho_{new}$, $\theta_{new}$ if said new position information is accompanied by a 4U unknown target input signal and either of said differences $\Delta\rho$, $\Delta\theta$ are less than said corresponding quantities $\Delta\rho_o$, $\Delta\theta_o$;
 removing corresponding position information $\rho_i$ $\theta_i$ if said differences $\Delta\rho$, $\Delta\theta$ are less than said corresponding quantities $\Delta\rho_o$, $\Delta\theta_o$ and said new position information is accompanied by a friend accept input signal;
 counting the number of antenna scans;
 removing a target position from storage when said counted number of antenna scans exceeds a predetermined number;
 counting the number of chances the target is given to properly respond to interrogations;
 declaring a target unknown when said count of chances the target is given to properly respond is greater than a predetermined number.

2. A device for maintaining IFF target position information and for providing target status information regarding new position $\rho$new, $\theta$ new information and previously stored position $\rho_i$, $\theta_i$ information and providing a target status indication comprising:
 means for receiving said position information $\rho$ new, $\theta$new, friend-accept and 4U unknown input signals;
 means coupled to said receiving means for storing a plurality of pairs $\rho_i$, $\theta_i$ of received position information;
 means coupled to said receiving means and to said storage means for comparing a new position pair $\rho$ new, $\theta$ new with each previously stored pair $\rho_i$, $\theta_i$;
 means coupled to said comparing means and to said storage means for storing said new position pair $\rho$ new, $\theta$ new if $\rho$new differs from each stored $\rho_i$ by more than a predetermined quantity $\Delta\rho_o$, or if $\theta$ new differs from each stored $\theta_i$ by more than a predetermined quantity $\Delta\theta_o$ and said new position information is accompanied by a said 4U unknown input signal, and for replacing a corresponding position pair with said new position pair $\rho$ new, $\theta$ new if $\rho$ new differs from each stored $\rho_i$ by less than said predetermined quantity $\Delta\rho$, or if $\theta$ new differs from each stored $\theta_i$ by less than said predetermined quantity $\Delta\theta_o$, and said new position information is accompanied by a said 4U unknown input signal;
 means coupled to said storage means and to said comparing means for counting the number of antenna revolutions past the target corresponding to each position pair;
 means coupled to said antenna counting means and to storage means for removing a position pair from storage when said antenna revolution count exceeds a predetermined number for the corresponding position pair;
 means coupled to said storage means and to said comparing means for counting the number of chances each position pair $\rho_i$ $\theta_i$ target has been given to properly respond;
 means coupled to said chances given counting means and to said storage means for indicating that a corresponding target is an unknown when said chances-given count exceeds a predetermined number for the corresponding position pair.

* * * * *